(12) United States Patent
Toksoz et al.

(10) Patent No.: US 11,477,103 B2
(45) Date of Patent: *Oct. 18, 2022

(54) SYSTEMS AND METHODS FOR LATENCY REDUCTION IN CONTENT ITEM INTERACTIONS USING CLIENT-GENERATED CLICK IDENTIFIERS

(71) Applicant: Google LLC, Mountain View, CA (US)

(72) Inventors: Tuna Toksoz, Mountain View, CA (US); Thomas Price, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/118,127

(22) Filed: Dec. 10, 2020

(65) Prior Publication Data

US 2021/0099372 A1 Apr. 1, 2021

Related U.S. Application Data

(63) Continuation of application No. 14/975,027, filed on Dec. 18, 2015, now Pat. No. 10,892,968.

(51) Int. Cl.
*H04L 43/0876* (2022.01)
*G06Q 30/02* (2012.01)
(Continued)

(52) U.S. Cl.
CPC ....... *H04L 43/0876* (2013.01); *G06Q 10/063* (2013.01); *G06Q 30/02* (2013.01);
(Continued)

(58) Field of Classification Search
CPC ............... G06Q 30/02; G06Q 30/0246; G06Q 30/0277; H04L 41/5025; H04L 67/327
See application file for complete search history.

(56) References Cited

U.S. PATENT DOCUMENTS

| 7,752,073 B2 | 7/2010 | Barry et al. |
| 8,180,376 B1 | 5/2012 | Merritt |

(Continued)

OTHER PUBLICATIONS

First Office Action for CN Appln. Ser. No. 201680034584.1 dated Apr. 21, 2021 (13 pages).
(Continued)

*Primary Examiner* — Barbara B Anyan
(74) *Attorney, Agent, or Firm* — Marshall, Gerstein & Borun LLP

(57) ABSTRACT

Systems and methods of reducing latency in online network traffic are provided. The system can include a processor and a memory couple to the processor. The memory stores computer-executable instructions, which when executed by the processor, cause the processor to identify an indication of an interaction with a content item presented within a content slot of an information resource, generate a click identifier that uniquely identifies the interaction, transmit a first request comprising a click resource link including the click identifier to a click server, and transmit a second request to access the landing page of the content item independent of transmitting the first request. The second request comprises a generated resource link that identifies a resource identifier of the landing page of the content item and the click identifier.

20 Claims, 6 Drawing Sheets

(51) Int. Cl.
*G06Q 10/06* (2012.01)
*H04L 67/60* (2022.01)
*H04L 41/5025* (2022.01)
*G06F 16/955* (2019.01)

(52) U.S. Cl.
CPC ..... *G06Q 30/0219* (2013.01); *G06Q 30/0241* (2013.01); *H04L 41/5025* (2013.01); *H04L 67/60* (2022.05); *G06F 16/9566* (2019.01)

(56) References Cited

U.S. PATENT DOCUMENTS

| | | | |
|---|---|---|---|
| 8,321,269 | B2 | 11/2012 | Linden et al. |
| 8,874,563 | B1* | 10/2014 | Brown ............... G06Q 30/0246 709/219 |
| 9,092,800 | B2 | 7/2015 | Owen et al. |
| 2003/0167213 | A1 | 9/2003 | Jammes et al. |
| 2003/0187923 | A1 | 10/2003 | Kimura et al. |
| 2005/0038900 | A1* | 2/2005 | Krassner ............ G06Q 30/0277 709/231 |
| 2005/0278443 | A1* | 12/2005 | Winner .................. G06Q 30/02 709/224 |
| 2006/0221940 | A1 | 10/2006 | Ong et al. |
| 2007/0288454 | A1 | 12/2007 | Bolivar et al. |
| 2008/0040143 | A1 | 2/2008 | Freeman |
| 2008/0294711 | A1 | 11/2008 | Barber |
| 2009/0094175 | A1 | 4/2009 | Provos et al. |
| 2009/0216592 | A1 | 8/2009 | Zhang |
| 2010/0324989 | A1 | 12/2010 | Etchegoyen |
| 2011/0153411 | A1* | 6/2011 | Levav ................... G06Q 30/06 705/14.41 |
| 2011/0185016 | A1 | 7/2011 | Kandasamy et al. |
| 2011/0213655 | A1 | 9/2011 | Henkin et al. |
| 2011/0238495 | A1 | 9/2011 | Kang |
| 2011/0258049 | A1 | 10/2011 | Ramer et al. |
| 2011/0270674 | A1 | 11/2011 | Cosman |
| 2012/0130829 | A1 | 5/2012 | Roth et al. |
| 2012/0173345 | A1 | 7/2012 | Yanefski et al. |
| 2012/0311017 | A1 | 12/2012 | Sze et al. |
| 2012/0324326 | A1* | 12/2012 | Kim .................... G06F 16/9566 715/205 |
| 2013/0018721 | A1 | 1/2013 | Levine et al. |
| 2013/0110585 | A1 | 5/2013 | Nesbitt et al. |
| 2013/0204696 | A1 | 8/2013 | Krassner et al. |
| 2013/0275547 | A1* | 10/2013 | Chew ...................... H04L 67/20 709/217 |
| 2013/0346186 | A1 | 12/2013 | Bezos et al. |
| 2015/0186913 | A1* | 7/2015 | Mann ................. G06Q 30/0219 705/14.21 |
| 2015/0206177 | A1 | 7/2015 | Yao et al. |
| 2017/0111375 | A1 | 4/2017 | Provos et al. |

OTHER PUBLICATIONS

"Google Analytics", Wikipedia, Dec. 22, 2017, retrieved Feb. 18, 2020 from URL: https://en.wikipedia.org/w/index.php?title=Google_Analytics&oldid=529361837 (8 pages).
"Naviator.sendBeacon()", Mozilla Developer Network and Individual Contributors, Apr. 19, 2016, (9 pages).
"URL Builder", Google Analytics Help, Oct. 18, 2013 (3 pages).
"Using ValueTrack", Google AdWords Help, Oct. 18, 2013 (7 pages).
Anonymous, "Google Analytics", Dec. 22, 2012, pp. 1-4, XP055075215, retrieved Jun. 25, 2018 from URL: http//en.wikipedia.org/w/index.php?title=Google_Analytics&oldid=529361837 (7 pages).
Examination Report for EP Appln. Ser. No. 16805635.6 dated Jan. 22, 2020 (8 pages).
Final Office Action for U.S. Appl. No. 14/057,421 dated Mar. 20, 2015 (15 pages).
Final Office Action for U.S. Appl. No. 14/975,027 dated Jul. 25, 2019 (10 pages).
Final Office Action for U.S. Appl. No. 14/975,027 dated Nov. 29, 2019 (10 pages).
Grigorik, Ilya, "Beacon: W3C Working Draft Feb. 9, 2016", Web Performance Working Group, 2016, W3C (10 pages).
Henson, John, "How to Track Ad Results Using Google Analytics", Web Marketing Today, Jan. 8, 2008 (4 pages).
International Preliminary Report on Patentability, Ch. II, for Appln. Ser. No. PCT/US2016/062111 dated Mar. 20, 2018 (29 pages).
International Search Report and Written Opinion for Appln.Ser. No. PCT/US2016/062111 dated Feb. 2, 2017 (13 pages).
Jain et al., "Beacon", W3C, Jun. 24, 2014, XP055338331, retrieved Jun. 25, 2018 from URL: https//www.w3 org/TR/2014/WD-beacon-20140624 (12 pages).
Jain et al., "Beacon: W3C Last Call Working Draft Jun. 24, 2014", 2014, retrieved Feb. 18, 2020 from URL: https://www.w3.org/TR/2014/WD-beacon-20140624/ (5 pages).
Non-Final Office Action for U.S. Appl. No. 14/057,421 dated Feb. 12, 2014 (28 pages).
Non-Final Office Action for U.S. Appl. No. 14/057,421 dated Jul. 31, 2014 (38 pages).
Non-Final Office Action for U.S. Appl. No. 14/975,027 dated Feb. 1, 2019 (8 pages).
Non-Final Office Action for U.S. Appl. No. 14/975,027 dated Jun. 29, 2018 (8 pages).
Non-Final Office Action for U.S. Appl. No. 14/975,027 dated Mar. 6, 2020 (10 pages).
Non-Final Office Action for U.S. Appl. No. 15/153,010 dated Jun. 25, 2018 (17 pages).
Notice of Allowance for U.S. Appl. No. 14/975,027 dated Sep. 17, 2020 (6 pages).
Notice of Allowance for U.S. Appl. No. 15/153,010 dated Mar. 29, 2019 (2 pages).
Notice of Allowance for U.S. Appl. No. 15/153,010 dated Nov. 28, 2018 (7 pages).
Notice of Allowance for U.S. Appl. No. 16/396,947 dated Mar. 9, 2020 (8 pages).
Notice of Allowance for U.S. Appl. No. 16/396,947 dated May 18, 2020 (4 pages).
Notice of Allowance for U.S. Appl. No. 16/396,947 dated Oct. 2, 2019 (10 pages).
Oxley, Ian, "Introduction to Beacon API", Sitepoint, Jan. 9, 2015, retrieved Feb. 18, 2020 from URL: https://www.sitepoint.com/introduction-beacon-api/ (4 pages).
Oxley, Ian, "Introduction to the Beacon API", Jan. 9, 2015, XP055337484, retrieved Jun. 25, 2018 from URL: https://www sitepoint.com/introduction-beacon-api/ (6 pages).
Stearns, Michael, "Tagging URLs for Better Tracking in Google Analytics", Practical Ecommerce, Jul. 16, 2009 (5 pages).

* cited by examiner

SYSTEMS AND METHODS FOR LATENCY REDUCTION IN CONTENT ITEM INTERACTIONS USING CLIENT-GENERATED CLICK IDENTIFIERS

CROSS-REFERENCE TO RELATED APPLICATIONS

The present application is a continuation application under 35. U.S.C. § 120 of U.S. application Ser. No. 14/975,027 titled "SYSTEMS AND METHODS FOR LATENCY REDUCTION IN CONTENT ITEM INTERACTIONS USING CLIENT-GENERATED CLICK IDENTIFIERS" and filed on Dec. 18, 2015, which is hereby incorporated by reference in its entirety.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

SUMMARY

At least one aspect is directed to a system for reducing latency in online network traffic. The system can include a processor and a memory coupled to the processor. The memory stores computer-executable instructions, which when executed by the processor, can cause the processor to identify an indication of an interaction with a content item presented within a content slot of an information resource and generate a click identifier that uniquely identifies the interaction with the content item. The content item can be received from a data processing system via a computer network. The computer-executable instructions, when executed by the processor, can further cause the processor to generate a first request comprising a click resource link including the click identifier and transmit, to a click server, the first request comprising the click resource link including the click identifier. The computer-executable instructions, when executed by the processor, can also cause the processor to generate a resource link that identifies i) a resource identifier of a landing page corresponding to the content item, and ii) the click identifier that uniquely identifies the interaction with the content item, and transmit a second request to access the landing page of the content item independent of transmitting the first request. The second request comprises the generated resource link.

In some implementations, the memory stores the computer-executable instructions, which when executed by the processor, can further cause the processor to transmit the first request to the click server at substantially the same time as transmitting the second request to access the landing page of the content item. In some implementations, the memory stores the computer-executable instructions, which when executed by the processor, can also cause the processor to transmit the first request to the click server via an asynchronous interface of an application of a computing device on which the information resource is presented. In some implementations, the asynchronous interface comprises a BEACON application plugin (API).

In some implementations, the memory stores the computer-executable instructions, which when executed by the processor, can further cause the processor to determine that the application is configured with the asynchronous interface. In some implementations, the content item received from the data processing system can also include an impression identifier that uniquely identifies an impression of the content item. The click identifier can include the impression identifier and a counter which indicates a number of times that the content item is interacted. In some implementations, the memory stores the computer-executable instructions, which when executed by the processor, can further cause the processor to identify an indication of a second interaction with the content item presented within the content slot of the information resource, and adjust a value of the counter of the click identifier responsive to identifying the indication of the second interaction.

At least one aspect is directed to a method of reducing latency in online network traffic. The method includes receiving, by a computing device comprising one or more processors, from a data processing system via a computer network, a content item for presentation within a content slot of an information resource. The method includes identifying, by the computing device, an indication of an interaction with the content item presented within the content slot of the information resource. The method includes generating, by the computing device, a click identifier that uniquely identifies the interaction with the content item. The method also includes generating, by the computing device, a first request comprising a click resource link including the click identifier, and transmitting, by the computing device to a click server, the first request comprising the click resource link including the click identifier. The method includes generating, by the computing device, a resource link that identifies i) a resource identifier of a landing page corresponding to the content item and ii) the click identifier that uniquely identifies the interaction with the content item, and transmitting, by the computing device, a second request to access the landing page of the content item independent of transmitting the first request, the second request comprising the generated resource link.

In some implementations, the method further includes transmitting the first request to the click server at substantially the same time as transmitting the second request to access the landing page of the content item. In some implementations, the method further includes transmitting the first request to the click server via an asynchronous interface of an application of the computing device on which the information resource is presented. In some implementations, the method further includes determining that the application is configured with the asynchronous interface. In some implementations, the method further includes identifying an indication of a second interaction with the content item presented within the content slot of the information resource and adjusting a value of the counter of the click identifier responsive to identifying the indication of the second interaction.

At least one aspect is directed to a method of reducing latency in online network traffic. The method includes a data processing system having one or more processors receiving, from a client device, a content request for a content item to present within a content slot of an information resource. The method includes, responsive to the content request, the data processing system transmitting the content item for presentation within the content slot of the information resource to the client device via the computer network. The content item includes an asynchronous click transmission script which includes computer-executable instructions. The computer-executable instructions, when executed by a processor of the client device, can cause the computing device to identify an indication of an interaction with the content item presented within the content slot of the information resource. The computer-executable instructions, when executed by the processor of the client device, can cause the client device to generate a click identifier that uniquely identifies the interaction with the content item. The computer-executable instructions, when executed by the processor of the client device, can also cause the client device to generate a first request comprising a click resource link including the click identifier and transmit, to a click server, the first request comprising the click resource link including the click identifier. The computer-executable instructions, when executed by the processor of the client device, can further cause the client device to generate a resource link that identifies i) a resource identifier of a landing page corresponding to the content item and ii) the click identifier that uniquely identifies the interaction with the content item, and transmit a second request to access the landing page of the content item independent of transmitting the first request, the second request comprising the generated resource link.

In some implementations, the computer-executable instructions, when executed by the processor of the client device, can further cause the client device to transmit the first request to the click server at substantially the same time as transmitting the second request to access the landing page of the content item. In some implementations, the computer-executable instructions, when executed by the processor of the client device, can further cause the client device to transmit the first request to the click server via an asynchronous interface of an application of the computing device on which the information resource is presented.

In some implementations, the computer-executable instructions, when executed by the processor of the client device, can further cause the client device to determine that the application is configured with the asynchronous interface. In some implementations, the computer-executable instructions, when executed by the processor of the client device, can further cause the client device to identify an indication of a second interaction with the content item presented within the content slot of the information resource and adjust a value of the counter of the click identifier responsive to identifying the indication of the second interaction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be appreciated that aspects and implementations can be combined and features described in the context of one aspect or implementation can be implemented in the context of other aspects.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
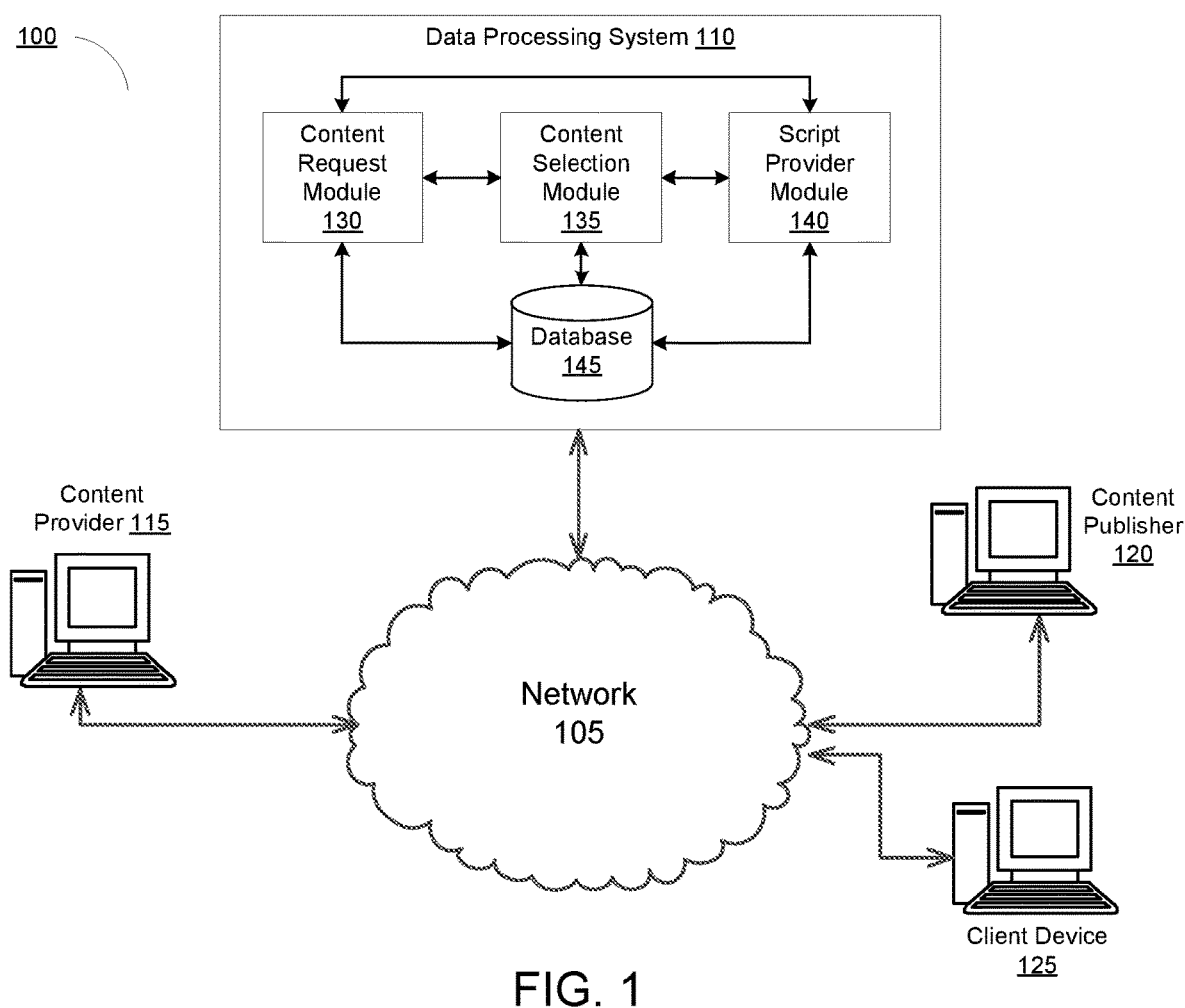
FIG. 1 is a block diagram depicting one implementation of an environment for reducing latency in online network traffic, according to an illustrative implementation.

Following below are more detailed descriptions of various concepts related to, and implementations of, methods, apparatuses, and systems of reducing latency in online network traffic in a computer network environment. The various concepts introduced above and discussed in greater detail below may be implemented in any of numerous ways, as the described concepts are not limited to any particular manner of implementation. For example, while herein content or content items may generally be referred to as advertisements, it will be appreciated that the content or content items may be any suitable content.

The present disclosure is directed generally to systems and methods of reducing latency in online network traffic by generating a click identifier (ID) at a client device responsive to an interaction with a content item (e.g., an advertisement or any other interactive content that may form a part of an interactive user interface). The generated click ID is transmitted to a click server using an asynchronous request or API at substantially the same time as the generated click ID is transmitted to a server of a landing page of the content item.

In some implementations, after a content item is clicked on at a client device, the client device sends a request to the click server indicating that the particular content item was clicked. Responsive to the request, the click server can record the click, generate a click ID indicating the click, and return a 302 redirect with the generated click ID to the client device. The browser at the client device can then be redirected to the landing page of the content item based on the 302 redirect. However, this method of monitoring clicks on content items can introduce latency caused by the client device sending a request to the click server and receiving the 302 redirect from the click server before the client device can be redirected to the landing page. In some implementations in which a security layer is added, for instance, SSL, there may be additional round trips that must be made before the client device is redirected to the landing page. Depending on the type of the connection, for instance, if the client device is on a 3G/4G network, or on other networks that have low bandwidth or transmission speeds (in some cases, in developing countries), the amount of time from the time the content item is clicked to the time the client device is redirected to the landing page can be in the order of a few seconds. This latency can be reduced by dissociating the click tracking process from the request to access the landing page of the content item.

The systems and methods described herein can reduce the latency by generating a click ID at the client device responsive to a click on an advertisement or other content items, and transmitting the generated click ID to the click server using an asynchronous request or API, while directing the browser to a Uniform Resource Locator (URL) of the landing page of the content item. Thus, the systems and methods described herein can avoid the steps of sending a request to the click server and receiving a 302 redirect before redirecting the browser to the landing page.

In some implementations, upon receiving a request for an advertisement or other content items, an advertisement server (or other content server) can send, to the client device, an advertisement including an asynchronous click transmission script which can be executed at the client device. The advertisement can also include an impression identifier that uniquely identifies the advertisement impression. The asynchronous click transmission script can cause the client device to determine whether an application (e.g., a browser) at the client device is compatible with an asynchronous API (e.g., a Beacon API). If the application at the client device is compatible with an asynchronous API, the asynchronous click transmission script can cause the client device to generate a click ID at the client device that uniquely identifies an interaction (e.g., a click) with the advertisement. In one implementation, the click ID can include the impression identifier and a counter. The impression identifier of the click ID can identify the advertisement displayed at the client device. The counter of the click ID can identify a number of times the client device recorded a click on the advertisement. Accordingly, each click can be identified by a unique click ID.

Once the click ID is generated, the asynchronous click transmission script can cause the client device to transmit the generated click ID to the click server using an asynchronous request or API, such as a Beacon API. For example, the asynchronous click transmission script can cause the application at the client device to generate and transmit a beacon request using the Beacon API. The beacon request can include the click ID generated by the client device. The asynchronous click transmission script can also cause the client device to generate a resource link by appending the generated click ID to the landing page URL, and cause the application of the client device to navigate to the landing page of the advertisement. In this way, the client device can provide information identifying the impression and the click to the content provider associated with the content item directly. In one implementation, at substantially the same time that the click ID is transmitted to the click server using the asynchronous API, the asynchronous click transmission script causes the application of the client device to navigate to the landing page based on the generated resource link such that latency in navigating to the landing page is avoided.

FIG. 1 is a block diagram depicting one implementation of an environment for reducing latency in online network traffic, according to an illustrative implementation. The environment 100 includes at least one data processing system 110. The data processing system 110 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 can also include any number of computing devices (e.g., computer, servers, routers, network switches, etc.) that are configured to receive and/or transmit data within network 105. The network 105 can further include any number of hardwired and/or wireless connections. For example, the client device 125 can communicate wirelessly (e.g., via WiFi, cellular, radio, etc.) with a transceiver that is hardwired (e.g., via a fiber optic cable, a CAT5 cable, etc.) to other computing devices in network 105.

The content provider computing device 115 can include servers or other computing devices operated by a content provider entity to provide content items such as advertisements for display on information resources at the client device 125. The content provided by the content provider computing device 115 can include third-party content items or creatives (e.g., ads) for display on information resources, such as a website or web page that includes primary content, e.g., content provided by the content publisher computing device 120. The content items can also be displayed on a search results web page. For instance, the content provider computing device 115 can provide or be the source of advertisements (ads) or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application (such as a gaming application, global positioning system (GPS) or map application or other types of applications) on a smartphone or other client device 125.

The content publisher computing device 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For instance, the content publisher computing device 120 can operate the website of a company and can provide content about that company for display on web pages of the website. The web pages can include content slots configured for the display of third-party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client device 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be communication devices through which an end-user can submit requests to receive content. The requests can be requests to a search engine and the requests can include search queries. In some implementations, the requests can include a request to access a web page.

The content provider computing device 115, the content publisher computing device 120 and the client device 125 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The content provider computing device 115, the content publisher computing device 120, and the client device 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the content provider computing device 115, the content publisher computing device 120 and the client device 125 (e.g., a built-in display, microphone, etc.) or external to the housing of content provider computing device 115, the content publisher computing device 120 and the client device 125 (e.g., a monitor connected to the user computing device 115, a speaker connected to the user computing device 115, etc.), according to various implementations. For example, the content provider computing device 115, the content publisher computing device 120 and the client device 125 can include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing device 115. In some implementations, the advertiser can communicate with the data processing system 110 via a user interface displayed on the user interface devices of the content provider computing device 115.

The data processing system 110 can include at least one server. For instance, the data processing system 110 can include a plurality of servers located in at least one data center or server farm. In some implementations, the data processing system 110 can include a third-party content placement system, e.g., an ad server or ad placement system. The data processing system 110 can include at least one content request module 130, at least one content selection module 135, at least one script provider module 140 and at least one database 145. The content request module 130, the content selection module 135 and the script provider module 140 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, and the script provider module 140 can include or execute at least one computer program or at least one script. The content request module 130, the content selection module 135, and the script provider module 140 can be separate components, a single component, or part of the data processing system 110. The content request module 130, the content selection module 135, and the script provider module 140 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, third-party content items (e.g., advertisements), and asynchronous click transmission script, among others, to serve to a client device 125.

The content request module 130 can receive a request for content from the client device 125. The request for content can include a request for an information resource, a request for one or more third-party content items, a request for a script (e.g., an asynchronous click transmission script) or a combination thereof. In some implementations, the request for content can include a request for third-party content. In some implementations, the request for third-party content can include an address or identifier of an information resource on which the third-party content is to be displayed. The request for third-party content can also include or identify one or more parameters that can be used by the data processing system 110 to determine the content to provide in response to the request for content. For example, the parameters can identify a size of a content slot within which to insert the requested content. The parameters can identify a type of content associated with the information resource, a type of third-party content requested (e.g., text, image, video, etc.), client device information, size information for requested third-party content item or a combination thereof. In some implementations, the request can identify a script, such as an asynchronous click transmission script.

In some implementations, the request for content can include a request for an information resource. The request for an information resource can include an address or identifier of the information resource. For example, the request for the information resource can include a URL of a specific resource such as a webpage (e.g., "http://www.example.com"). The request for information resource can also include client device information (such as a device type, device identifier or a combination thereof).

In some implementations, the request for content can include a request for an asynchronous click transmission script. In some implementations, the request for the asynchronous click transmission script can include an indication of the requested script, an address or identifier of an information resource or a combination thereof. In some implementations, the request for the asynchronous click transmission script can identify an asynchronous click transmission script. In some implementations, the content request module 130 can be configured to parse the request for content and determine to forward the request for content to the content selection module 135 or to the script provider module 140. For instance, if an asynchronous click transmission script is determined to be sent to the client device 125 in response to the received request for content, the content request module 130 can forward the request for content to the script provider module 140. Otherwise, the request module 130 can forward the request for content to the content selection module 135. In some implementations, the content request module 130 can determine to forward the request for content to both the content selection module 135 and the script provider module 140. The content request module 130 can determine whether or not a script is to be sent to the client device 125 based on the type of the request for content (e.g., a request for an information resource, a request for third-party content or a request for an asynchronous click transmission script), an indicator in the content request (e.g., an indicator indicative of an asynchronous click transmission script or an indicator indicating that an information resource is eligible for asynchronous click transmission), an information resource identifier in the request for content, an indication of whether the client device can generate a click identifier, or a combination thereof. In some implementations, the content request module 130 can determine whether or not a script is to be sent to the client device 125 by comparing an identification of the information resource to a list of information resource identifiers (e.g., resource information identifiers eligible for receiving the asynchronous click transmission script). In some implementations, the information resource identifier can be a URL. In some implementations, the information resource identifier can be a domain to which the information resource belongs. In some implementations, the information resource identifier can be an IP address corresponding to a server hosting the information resource. In some implementations, the content request module 130 can automatically forward the request for content to the content selection module 135 without checking whether or not a script is to be sent to the client device 125. In some implementations, the content request module 130 can forward the request to the script provider module 140 regardless of whether the request for content includes a request for the asynchronous click transmission script.

The content selection module 135 can be configured to determine content to be transmitted to the client device 125 in response to a received request for content. The content selection module 135 can determine the content to be sent to the client device 125 based on information included in the request for content. For instance, upon receiving a request for an information resource, the content selection module 135 can use the address or identifier of the information resource in the request for content to determine the content to send to the client device. In the case of receiving a request for one or more third-party content items, the content selection module 135 can select the third-party content item(s) based on an address or identifier for the information resource on which the third-party content item is to be presented, content type information (e.g., sports, news, music, movies, travel, etc.) for the information resource, size information of the slot(s) in which the third-party content item(s) is/are to be displayed, client device information (e.g., device type, device identifier, device location, etc.). In some implementations, the request for third-party content can also include a minimum revenue amount (or minimum bid value) for displaying a third-party content item on the information resource. In some implementations, the content selection module 135 can communicate with an advertising auction system and provide the advertising auction system information included in the request for third-party content received from the client device. The content selection module 135 can also receive one or more third-party content items from the advertising auction system responsive to providing the information included in the request for third-party content. In some implementations, the content selection module 135 can access the database 145 and retrieve the content for sending to the client device 125.

In some implementations, the content selection module 135 can be configured to determine whether or not a script is to be sent to the client device 125 in response to the request for content. The content selection module 135 can determine whether or not a script is to be sent to the client device 125 based on the type of the content request (e.g., a request for an information resource, a request for third-party content or a request for an asynchronous click transmission script), an indicator in the request for content (e.g., an indicator indicative of an asynchronous click transmission script), an information resource identifier in the request for content or a combination thereof. In some implementations, the content selection module 135 can determine whether or not a script is to be sent to the client device 125 by comparing an identification of the information resource to a list of information resource identifiers (e.g., information resource identifiers eligible for receiving the asynchronous click transmission script). Upon determining that a script is to be sent to the client device 125, the content selection module 135 can forward the request for content or an indication thereof to the script provider module 140. In some implementations, the content selection module 135 can select a third-party content item to send to the client device 125 along with a script, such as the asynchronous click transmission script.

The script provider module 140 can be configured to retrieve an asynchronous click transmission script from the database 145 and transmit the retrieved script to the client device 125 (or to another entity for sending to the client device 125). In some implementations, the asynchronous click transmission script can be transmitted to the client device 125 separately or together with a third-party content item. For instance, the script provider module 140, the content selection module 135 or another entity of the data processing system 110 can include the asynchronous click transmission script into the third-party content item before sending the third-party content item to the client device 125. In some implementations, the script provider module 140, the content selection module 135 or another entity of the data processing system 110 can send the asynchronous click transmission script together with a requested information resource to the client device 125.

The asynchronous click transmission script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed within an application of the client device 125, such as the application that caused the client device 125 to transmit the content request received by the content request module 130. The application can include, for example, an Internet browser, a mobile application, a gaming application, a GPS application, or any other computer program capable of reading and executing the computer-executable instructions. In brief overview, the computer-executable instructions, when executed by a processor of the client device 125, can cause an application of the client device to: (a) identify an indication of an interaction with the content item presented within a content slot of the information resource, (b) generate a click identifier that uniquely identifies the interaction with the content item, (c) generate a first request comprising a click resource link including the click identifier, (d) transmit, to a click server, the first request comprising the click resource link including the click identifier, (e) generate a resource link that identifies i) a resource identifier of a landing page corresponding to the content item, and ii) the click identifier that uniquely identifies the interaction with the content item, and (f) transmit a second request to access the landing page of the content item independent of transmitting the first request, the second request comprising the generated resource link. Additional details relating to the asynchronous click transmission script are provided further herein in relation to FIGS. 2, 3, 4 and 5.

Figure 2:
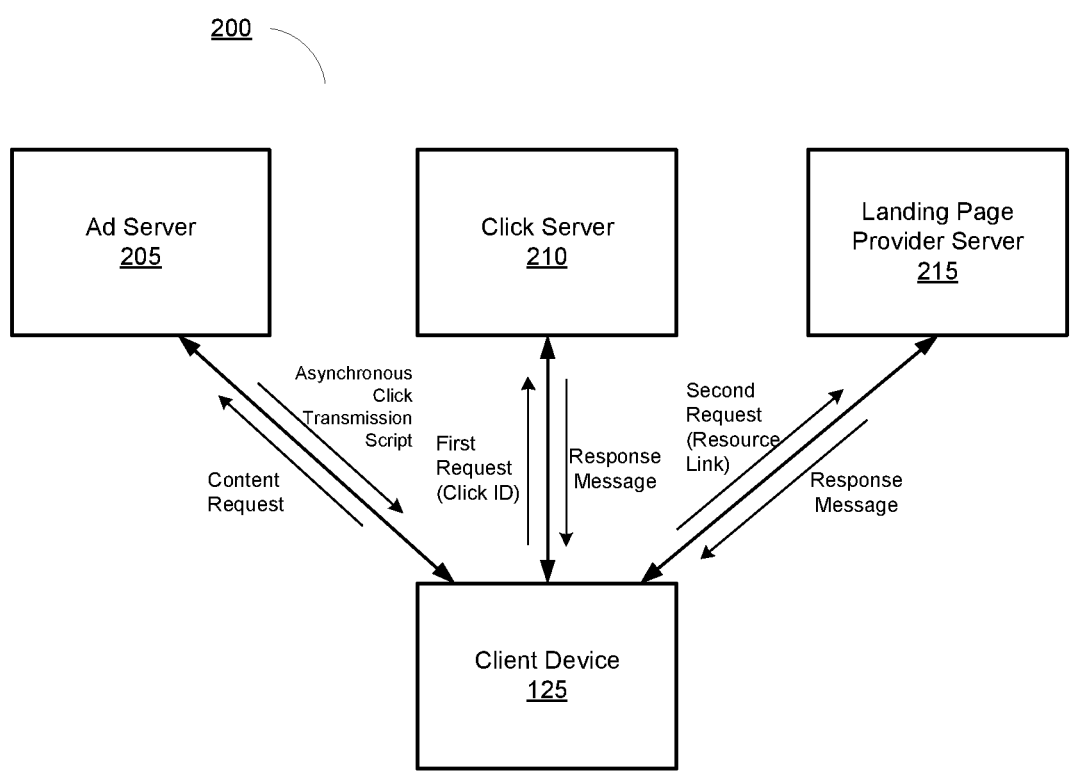
FIG. 2 is a block diagram depicting one implementation of an environment for reducing latency in online network traffic, according to an illustrative implementation.

FIG. 2 is a block diagram depicting one implementation of an environment for reducing latency in online network traffic, according to an illustrative implementation. The client device 125 can be the device 125 in FIG. 1 as described herein and can communicate with the ad server 205, the click server 210, and the landing page provider server 215 via the network 105. The ad server 205 and/or the click server 210 can be servers in the data processing system 110 in FIG. 1. The ad server 205 and/or the click server 210 can also include servers outside of the data processing system 110. The landing page provider server 215 can include a server of the content provider computing device 115 in FIG. 1. The landing page provider server 215 can also include a server in the data processing system 110 or a server outside of both the content provider computing device 115 and the data processing system 110. In some implementations, the ad server 205, the click server 210, and the landing page provider server 215 can include hardware and software described herein with respect to the servers in the data processing system 110, the client device 125, the content provider computing device 115, or the content publisher computing device 120. In some implementations, the ad server 205 can include the content request module 130, the content selection module 135, and the script provider module 140 of FIG. 1 as described herein.

Referring now to FIGS. 1 and 2 together, in some implementations, the data processing system 110 can receive, via the computer network 105, from the client device 125, a content request for a content item to present within a content slot of an information resource. For example, the ad server 205 or the content request module 130 of the data processing system 110 can receive a content request for content (or a content item) to present within a content slot of an information resource (e.g., a web page) from the client device 125.

In some implementations, the data processing system 110, responsive to the content request, can transmit, via the computer network 105, the content item for presentation within the content slot of the information resource. For example, the ad server 205 or the content request module 130 of the data processing system 110 can transmit, to the client device 125, the content item for presentation within the content slot of the information resource. The content item can be selected by the data processing system 110 or the ad server 205 by conducting an auction. In some implementations, one or more content items can be selected and transmitted to the client device 125. In some implementations, the content item can include a script, such as an asynchronous click transmission script, which includes computer-executable instructions. The computer-executable instructions can be executed at the client device 125 to cause one or more processors of the client device 125 to perform operations as described herein. One example of a system in relation to the asynchronous click transmission script is shown in FIG. 3.

Figure 3:
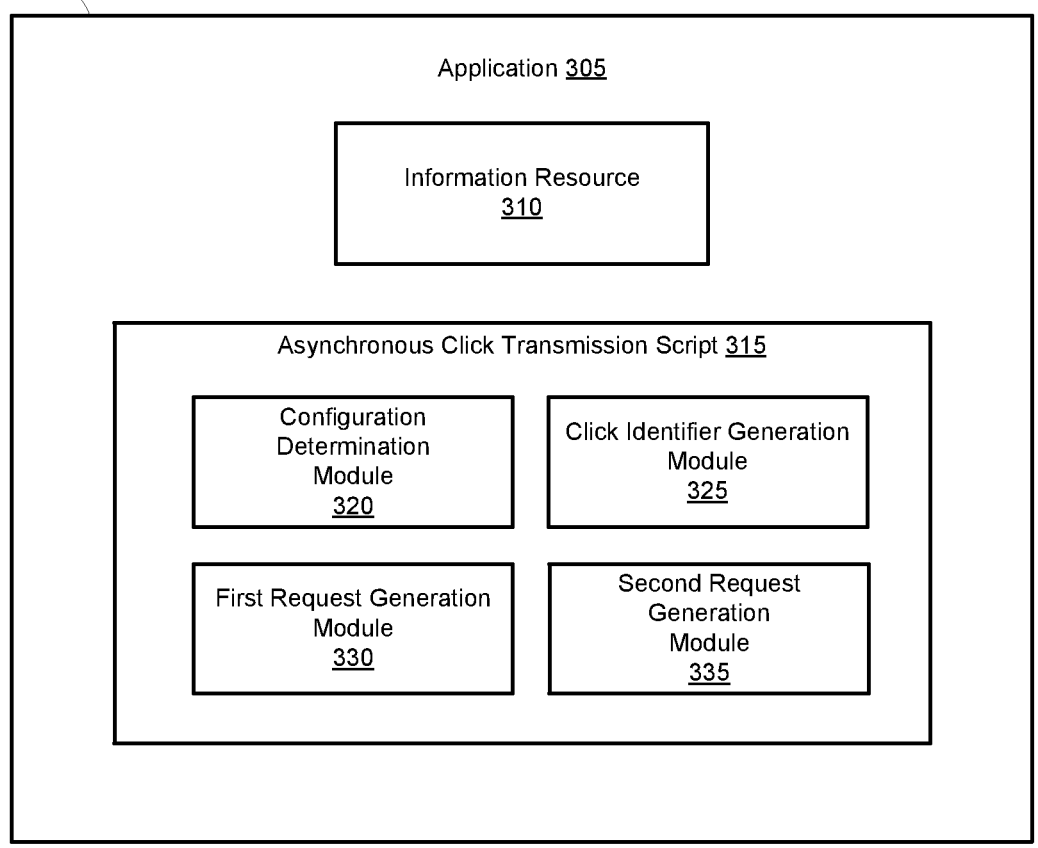
FIG. 3 is a block diagram depicting one implementation of a system for reducing latency in online network traffic, according to an illustrative implementation.

FIG. 3 is a block diagram depicting one implementation of a system 300 for reducing latency in online network traffic, according to an illustrative implementation. The asynchronous click transmission system 300 can include an application 305, an information resource 310, a configuration determination module 320, a click identifier generation module 325, a first request generation module 330, and a second request generation module 335. In some implementations, the configuration determination module 320, the click identifier generation module 325, the first request generation module 330, and the second request generation module 335 can be modules within an asynchronous click transmission script 315. The asynchronous click transmission script system 300 can be run or otherwise be executed by one or more processors of a computing device, such as those described below in FIG. 6. In some implementations, any of the configuration determination module 320, the click identifier generation module 325, the first request generation module 330 and the second request generation module 335 can be part of the application 305, information resource 310 or the asynchronous click transmission script 315.

The application 305 can include, for example, an Internet browser, mobile application, gaming application, GPS application, or any other computer program capable of executing or otherwise invoking computer-executable instructions, such as the computer-executable instructions included in the information resource 310, the configuration determination module 320, the click identifier generation module 325, the first request generation module 330, and the second request generation module 335. The application 305 can obtain or receive the information resource 310 from a server hosting the information resource, such as a server of the content publisher 120, a server of the content provider 115, or a server of the data processing system 110. For instance, the application 305 can send a request including an address or an identifier of the information resource 310 to the server and, in response, receive the information resource 310. The information resource 310 can include one or more content portions (or content elements). The information resource 310 can specify the positions of the one or more content elements. In some implementations, the information resource 310 can include portions for primary content and portions for third-party content or content items, such as advertisements.

Referring now to FIGS. 1, 2 and 3 together, in some implementations, the configuration determination module 320 executing on the client device 125 can cause the client device 125 to determine whether the application 305 is configured with an asynchronous interface or asynchronous Application Programming Interface (API). As described in more details below, the asynchronous interface or asynchronous API can be a BEACON interface or BEACON API. Some applications, for example some browsers or some old versions of some browsers, may not support or be compatible with the asynchronous interface or asynchronous API. In some implementations, the configuration determination module 320 can determine that a browser or application 305 executing on the client device 125 is configured with the asynchronous interface or asynchronous API by inspecting a version of the application and comparing the version with a list of applications known to be configured with the asynchronous interface or asynchronous API. In some implementations, the configuration determination module 320 can run one or more tests to determine if the application 305 is configured with the asynchronous interface or asynchronous API. For instance, the configuration determination module 320 can cause the application to execute one or more instructions that would cause the application executing on the client device to send a request using the asynchronous interface or asynchronous API to a destination address. The configuration determination module 320 can then confirm whether the application was able to send the request by analyzing an activity log or by receiving confirmation from a server of the destination address indicating the that the request from the application 305 was received. If the configuration determination module 320 determines that the application 305 is not configured or compatible with the asynchronous interface, the method utilizing the 302 redirect as described herein above can be invoked. Conversely, if the configuration determination module 320 determines that the application 305 is configured or compatible with the asynchronous interface, the method utilizing a click identifier generated at the client device as described herein below can be invoked.

In some implementations, the click identifier generation module 325 executing on the client device 125 can cause the client device 125 to identify an indication of an interaction with a content item presented within a content slot of the information resource. In some implementations, a content item or third-party content item received by the client device 125 from the data processing system 110 or the ad server 205 can be presented within a content slot of the information resource 310 of the client device 125. One example of an information resource having third party content items is illustrated in FIG. 4.

Figure 4:
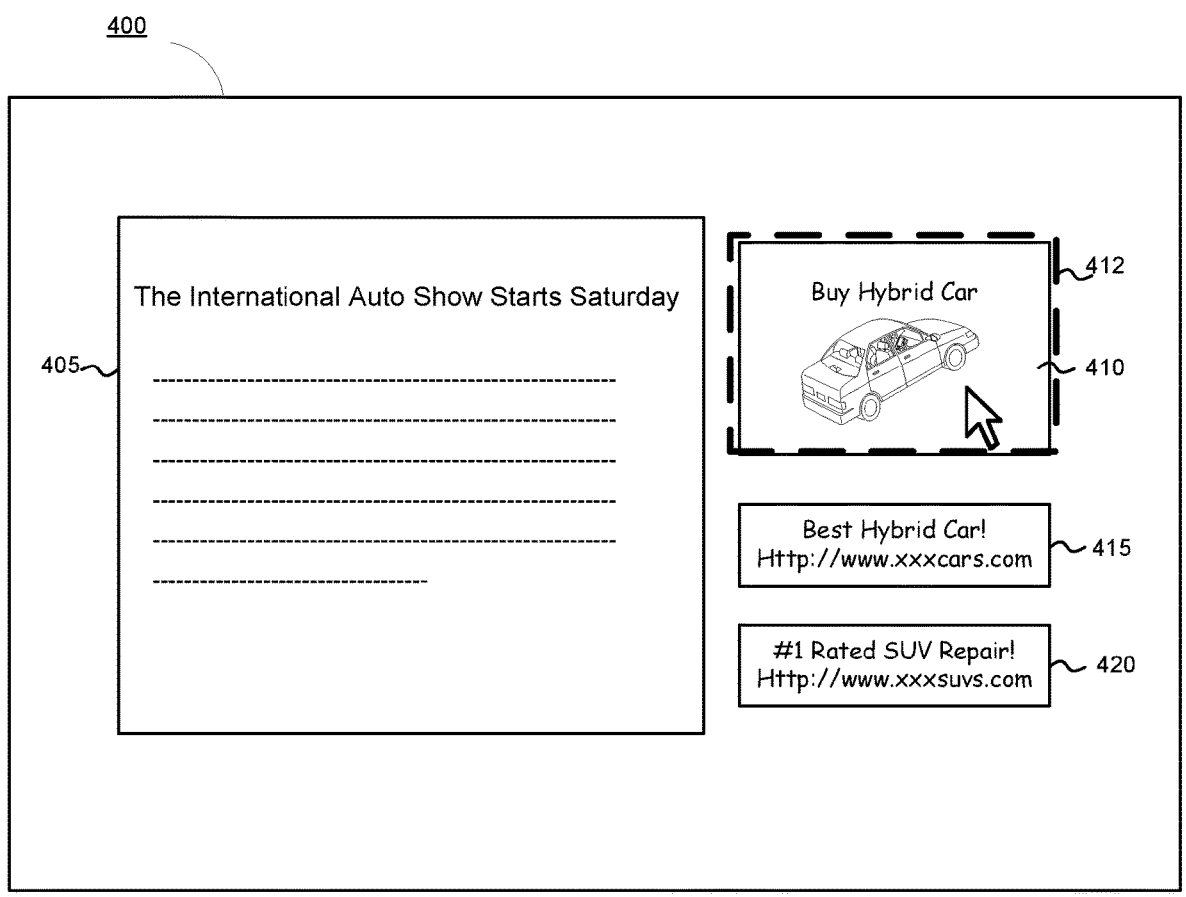
FIG. 4 is a block diagram illustrating an information resource having content items provided at a client device, according to an illustrative implementation.

FIG. 4 is a block diagram illustrating an information resource 400 having content items provided at the client device 125, according to an illustrative implementation. The information resource 400 can be a web page or other documents displayed on the client device 125. As shown in FIG. 4, the news article 405, which is the primary content of the information resource 400, is located in a portion of the information resource 400. The content items or third-party content items 410, 415, and 420 are located in a different portion of the information resource 400. In some implementations, the various functions associated with the content items 410, 415, and 420 may be implemented by including one or more advertisement tags within the information resource code located in a HTML and/or other files. For example, a HTML file may include an advertisement tag that specifies that a content item slot is to be located at the position of the content item 410. Another advertisement tag may request an advertisement from a remote location, for example, from the database 145 of the data processing system 110. Such a request may include one or more keywords or other data (e.g., a cookie) used by the data processing system 110 to select a content item to provide to the user device 125.

In some implementations, when a content item (such as content item 410) presented within a content slot (such as content slot 412) of the information resource 400 is interacted with, the click identifier generation module 325 executing on the client device 125 can cause the client device 125 to identify such an interaction. For example, an interaction can include a user using a mouse, a key pad, or other input device to click on or select the content item 410. A user can also interact with the content item displayed on a touch screen by using a stylus/pen or one or more fingers. For example, as shown in FIG. 4, the content item 410 is clicked on. In some implementations, the application 305 on which the information resource 400 is presented can execute instructions, which can cause the client device to deploy listeners or other agents to detect interactions performed by input devices, such as a keyboard, mouse, or touchscreen, among others. In some implementations, the client device can deploy listeners, such as an OnScroll listener, among others, to detect actions performed by an input device. Via the listeners, the client device can detect a click event on the content item 410. The application can cause the client device to generate a signal or an event indicating the click event.

In some implementations, the click identifier generation module 325 executing on the client device 125 can generate a click identifier that uniquely identifies the interaction with the content item. For example, responsive to identifying a click on the content item 410, the click identifier generation module 325 executing on the client device 125 can cause the client device to generate the click identifier. In some implementations, the click identifier can include an impression identifier and a counter. The impression identifier can uniquely identify an impression of the content item. The counter can indicate a number of times that the content item is interacted at the client device. In some implementations, the click identifier can be generated using a random number generator or using a map routine (e.g., a hash function).

In some implementations, the content item received from the data processing system 110 or the ad server 205 can include an impression identifier that uniquely identifies an impression of the content item. In some implementations, each instance that a content item is transmitted to a client device from the data processing system 110 (or the ad server 205) can be counted as one impression and can be identified by the impression identifier. For example, the data processing system 110 (or the ad server 205) can generate and include in the content item, a unique identifier that uniquely identifies an impression of the content item. The impression identifier can be a combination of information associated with the impression of the content item. For example, the impression identifier can include an identifier or a name of the content item (e.g., this content item is the number 50 advertisement from this particular advertiser), time of day that the content item is selected or transmitted by the data processing system 110, a location of the client device requesting the content item (e.g., a geographic location, an Internet Protocol (IP) address), a URL or other identifiers that identify the domain (website) or the web page that the content item is to be displayed, keywords, an identifier of the content slot that the content item presented in, a search query, a topic of the information resource, a type of the client device, profile information, or any other information associated with the content item and/or the request for the content item. In other implementations, the impression identifier can be generated by a random number generator of the data processing system 110 or the ad server 205.

In some implementations, each time the content item presented within the content slot of the information resource is interacted with, the application of the client device on which the content item is presented can cause the client device to adjust a value of a counter used to generate the click identifier. For example, each time the content item 410 is clicked on, the value of the counter of the click identifier is adjusted. For instance, the counter can have an initial value (e.g., 0, 10, 100, etc.) and each time the content item 410 is clicked on, the counter can be incremented or decremented. Thus, in these implementations, each click on the content item can be uniquely identified. As an example, in some implementations, the content item transmitted from the data processing system 110 or the ad server 205 can be cached at the client device 125. In such a case, when the user reloads the information resource (by refreshing the information resource presented on the application, for instance) which displayed the content item previously, the cached content item may be displayed again in the same content slot of the information resource. Accordingly, in these implementations, the impression identifier of the content item may stay the same. However, by using a counter, each time the content item is clicked on, a different counter value can be generated even though the impression identifier stays the same. Therefore, the click identifier which can include both the impression identifier and the counter can be unique such that each click of the content item can be uniquely identified. In some implementations, the click identifier can be generated using one or more additional parameters. For instance, in some implementations, the click identifier can be generated using the system time, or a combination of other system data, to ensure that even if the counter's data is lost during a page reload, a different unique click ID will still be generated for each subsequent click.

In some implementations, the first request generation module 330 executing on the client device 125 can cause the client device to generate a first request comprising a click resource link including the click identifier. In some implementations, when the content item is clicked on or otherwise accessed or interacted with, the client device can generate a request (e.g., a Hypertext Transfer Protocol (HTTP) request) with a click resource link including the click identifier, for example, as follows:

example.g.click.net/pagead/aclk?ai={the impression identifier}&p={COUNTER}.

As described herein above, the click identifier can include the impression identifier and the counter. Each time the content item is clicked on, the counter can be adjusted (e.g., incremented or decremented). For example, for the first click on the content item, the click resource link may be as follows:

example.g.click.net/pagead/aclk?ai={the impression identifier}&p=0.

Continuing with the example, when the content item is clicked on the second time, the click resource link may be as follows:

example.g.click.net/pagead/aclk?ai={the impression identifier}&p=1.

In some implementations, the first request generation module 330 executing on the client device 125 can cause the client device to transmit, to the click server 210, the first request comprising the click resource link including the click identifier via the network 105. As described herein above, the click server 210 can be a server within or outside of the data processing system 110. The click server 210 can be used to record the clicks of (interactions with) the content item at the client device 125. In response to the client device transmitting the generated click identifier that uniquely identifies the interaction with the content item to the click server, the click server can record each click (or interaction) on the content item. Such a recording may be used for many purposes. For example, by recording the clicks on a content item displayed on an information resource of a content publisher (e.g., content publisher 120), the content publisher of the information resource may be paid based on the number of clicks on the content item (e.g., advertisement) if the number of clicks is one of the criteria that the content provider (e.g., the content provider 115, such as an advertiser) pays the content publisher for placing the content provider's advertisements or other content on the content publisher's information resource. Furthermore, content providers can determine whether they would like to place their advertisements or other content on the information resource of a particular content publisher based on the number of clicks the content item receives. In some implementations, in response to the first request, the click server 210 can return a response message to the client device 125. The response message can contain completion status information of the first request and may contain other information in the message body.

In some implementations, the first request generation module 330 executing on the client device 125 can transmit the first request to the click server 210 via an asynchronous interface of the application 305 of the client device 125 on which the information resource 310 is presented. For example, the first request generation module 330 can cause the application 305 to queue up an asynchronous request to the generated click resource link using an asynchronous Application Programming Interface (API). In some implementations, the first request generation module 330 can cause the application 305 to queue up a beacon request to the generated click resource link using a BEACON API or application plugin. In some implementations, the asynchronous interface can be part of the application 305 of the client device 125 on which the information resource 310 is displayed. In other implementations, the asynchronous interface can be a standalone application. By using an asynchronous interface to transmit the generated click identifier to the click server, the client device 125 can transmit the generated click identifier to the click server independent from and separate from a request to access a landing page of the content item. Further, the client device 125 can transmit the generated click identifier via a process separate from the request to access the landing page. In doing so, the click server can receive the generated click identifier and store the received click identifier in a data structure maintained by the click server.

In some implementations, a navigator.sendBeacon( )method can be used to asynchronously transfer small HTTP data from the client device to a server. In some implementations, the syntax for such a method is as follows:

navigator.sendBeacon(url, data), where the url parameter indicates the resolved URL where the data is to be transmitted and the data parameter is the data that is to be transmitted. In some implementations, the url parameter can correspond to a URL of the click server, while the data parameter can include a value corresponding to the generated click identifier. The sendBeacon method can transmit data provided by the data parameter to the URL provided by the url parameter. The client device can transmit data at the earliest available opportunity, but can prioritize the transmission of data lower compared to other network traffic. In some implementations, the sendBeacon method can return a true value if the client device is able to successfully queue the data for transfer. Otherwise, the sendBeacon method can return a false value.

In some implementations, the second request generation module 335 executing on the client device 125 can cause the client device to generate a resource link that identifies (i) a resource identifier of a landing page corresponding to the content item, and (ii) the click identifier that uniquely identifies the interaction with the content item. The resource link can be used to access a landing page of the content item. The landing page can be a web page or other document that is presented for display on the client device responsive to an action taken on the content item when the content item is presented on the client device. For example, the second request generation module 335 can cause the client device 125 to generate the resource link by appending the click identifier to the resource identifier (for instance, a URL) of the landing page. The resource identifier of the landing page can be a URL or other identifier of the landing page. The landing page can be a web page of the content provider of the content item and may provide more information of the content item. For example, a landing page may include additional product information of the product that is advertised in the content item. A conversion relating to the content item can occur at the landing page, e.g., a user can purchase the product or service advertised by the content item via the landing page. A conversion can happen when a user clicks on a content item and then takes an action, such as a purchase, a sign-up, a registration, etc. via the landing page.

In some implementations, the second request generation module 335 executing on the client device 125 can transmit a second request to access the landing page of the content item via the network 105, independent of transmitting the first request. The second request can comprise the generated resource link. In some implementations, the second request generation module 335 can cause the application 305 to submit a HTML request including the generated resource link to the landing page provider server 215. The generated resource link can identify (i) a resource identifier of a landing page corresponding to the content item, and (ii) the click identifier that uniquely identifies the interaction with the content item. For example, the landing page provider server 215 can be a server of the content provider computing device 115 and can host the landing page of the content item. By including the click identifier that uniquely identifies the interaction with the content item in the resource link, a conversion occurs at the landing page can be associated with the particular interaction or click at the client device and can be recorded by the data processing system 110 or the ad server 210. In some implementations, in response to the second request, the landing page provider server 215 can return a response message to the client device 125. The response message can contain completion status information of the second request and can contain the requested content in the message body. For example, the requested landing page can be transmitted to and displayed at the client device 125.

In some implementations, the second request generation module 335 executing on the client device 125 can transmit the second request to access the landing page independent of the first request generation module 330 transmitting the first request including the click identifier to the click server. In some implementations, upon the first request generation module 330 transmitting the first request to the click server 210, before (or without waiting for) the response message from the click server 210 is returned to the client device 125, the second request generation module 335 transmits the second request to access the landing page. In other implementations, the second request generation module 335 can transmit the second request to access the landing page first, and before (or without waiting for) the response message from the landing page provider server 215 is returned to the client device 125, the first request generation module 330 transmits the first request to the click server 210. In these implementations, the first request to the click server 210 and the second request to the landing page provider server 215 can be transmitted independent of each other. Such a mechanism can reduce latency because the landing page can be presented to the user without waiting for the click server 210 to return a 302 redirect or other message or request to the client device 125. By avoiding the steps of waiting for the click server to return a 302 redirect to the client device and then navigating to the landing page, the landing page can be presented to the user at the client device faster or in less time than the 302 redirect method as described herein above.

In some implementations, the first request generation module 330 executing on the client device 125 can transmit the first request to the click server 210 at substantially the same time as the second request generation module 335 executing on the client device 125 transmitting the second request to access the landing page of the content item. In some implementations, once the first request generation module 330 causes the client device 125 to transmit the first request to the click server 210, the second request generation module 335 causes the client device 125 to transmit the second request to the landing page provider server 215. In other implementations, immediately after the second request generation module 335 causes the client device 125 to transmit the second request to the landing page provider server 215, the first request generation module 330 can cause the client device 125 to transmit the first request to the click server 210. In some implementations, the amount of time between the transmission of the two requests can be based on the processing capabilities of the client device. In some implementations, the application 305 can cause the client device 125 to execute a first set of instructions to transmit the first request and then execute a second set of instructions to transmit the second request. The amount of time the client device takes to execute the second set of instructions after executing the first set of instructions can be less than 100 milliseconds, 100-500 milliseconds, or more than 500 milliseconds. In some implementations, the application can cause the client device to transmit one of the first request or the second request after executing other instructions on the information resource. In some such implementations, the amount of time between the two requests can be based on other factors, including the number and types of instructions the client device has to perform, among others. In some implementations, the application can cause the client device to delay transmission of the first request to the click server based on network traffic and resource availability.

As described above, in some implementations that do not implement the systems and methods for reducing latency described herein, after a content item is clicked on at a client device, the client device sends a request to the click server indicating that the particular content item (e.g., advertisement) was clicked. Responsive to the request, the click server can record the click, generate a click ID indicating the click, and return a 302 redirect with the generated click ID to the client device. In some implementations, the click server can further be configured to set a cookie on the client device that is included in the 302 redirect. In some implementations however, for instance if a user clicks on an ad to install a mobile application on a mobile device, the click server does not set a cookie on the client device. Instead, conversions are tracked using an advertising identifier or IDFA associated with the mobile device that can be used by advertisers.

In some implementations that do not implement the systems and methods for reducing latency described herein, for example, a client device can be presented with a content item to install a mobile application on the client device. Responsive to a user of the client device clicking the content item, the client device generates a request to be directed to the URL of the click server associated with the content item. The click server can be configured to append a click identifier generated by the click server to the URL of the landing page of the content item (which may be a URL that causes the client device to launch another application, such as a marketplace application from where the mobile application can be installed). The client device can then launch the marketplace application. Responsive to the client device receiving a request to install the mobile application via the marketplace application, the client device, via a conversion tracking software development kit (SDK) that may be included in the marketplace application, can note referrer parameters, and make a ping to the data processing system 110, which can be recorded as a conversion.

In some implementations that implement the systems and methods for reducing latency described herein, an application install process can be different from the process described above. In one such implementation, a client device can be presented with a content item to install a mobile application on the client device. Responsive to a user of the client device clicking the content item, the client device can generate a click identifier at the client device based on either a random universally unique identifier (UUID) generated on the client device, or a server generated number. The client device can then append the generated click identifier to the URL of the landing page and transmit a request to access the URL of the landing page including the generated click identifier. The client device can then launch the marketplace application. The client device, via a conversion tracking software development kit (SDK) that may be included in the marketplace application, can note referrer parameters, and make a ping to the data processing system 110, which can be recorded as a conversion. In some implementations, the data processing system 110 can be configured to perform a lookup for the generated click identifier to attribute the conversion to the impression or click identified by the generated click identifier.

Figure 5:
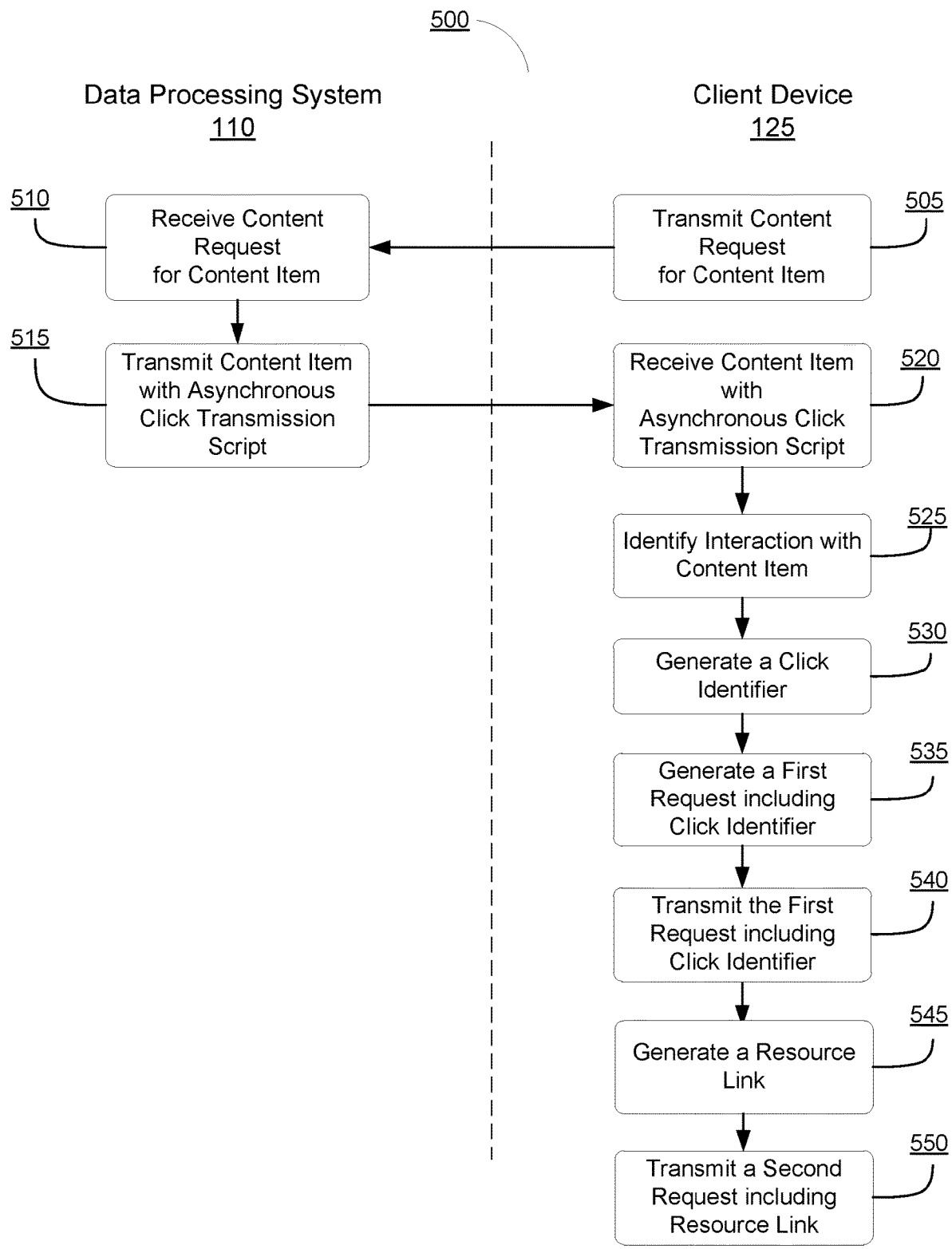
FIG. 5 is a flow diagram depicting a method of reducing latency in online network traffic, according to an illustrative implementation.

FIG. 5 is flow diagram depicting a method 500 of reducing latency in online network traffic, according to an illustrative implementation. In brief overview, the method 500 can include a client device transmitting a content request for content item to present within a content slot of an information resource to a data processing system (BLOCK 505). The method 500 can include the data processing system receiving the content request for content item (BLOCK 510) and, in response, transmitting the content item including an asynchronous click transmission script to the client device (BLOCK 515). The method 500 can include the client device receiving the content item including the asynchronous click transmission script from the data processing system (BLOCK 520). The method 500 can include, upon executing the asynchronous click transmission script, the client device identifying an indication of an interaction with the content item (BLOCK 525), generating a click identifier (BLOCK 530) that uniquely identifies the interaction, generating a first request comprising a click resource link including the click identifier (BLOCK 535), transmitting the first request including the click identifier (BLOCK 540) to a click server, generating a resource link (BLOCK 545) that identifies (i) a resource identifier of a landing page, and (ii) the click identifier, and transmitting a second request including the resource link (BLOCK 550) to access the landing page independent of transmitting the first request.

In further detail, the method 500 can include the client device transmitting, via a computer network, to a data processing system, a content request for a content item to present within a content slot of an information resource at the client device (BLOCK 505). For example, the client device or an application thereof can send a request for a content item including an address or an identifier of the information resource, an identifier of the content slot to the data processing system, and other information (e.g., keywords, query, etc.) to the data processing system or an ad server.

The method 500 can include the data processing system receiving the content request for the content item (BLOCK 510) and, in response, transmitting the content item including an asynchronous click transmission script to the client device (BLOCK 515). For example, a content request module of the data processing system or the ad server can receive the content request and transmit the content item including the asynchronous click transmission script to the client device. In some implementations, the content item transmitted to the client device can further include an impression identifier that uniquely identifies an impression of the content item at the client device.

The method 500 can include the client device receiving the content item including the asynchronous click transmission script from the data processing system or the ad server (BLOCK 520). The asynchronous click transmission script includes computer-executable instructions that when executed by one or more processors of the client device, can cause the client device to perform the method steps described herein below. In some implementations, a configuration determination module of the asynchronous click transmission script can cause the client device to determine whether an application (e.g., a browser) of the client device on which the information resource (e.g., a web page) is presented is configured with an asynchronous interface (e.g., a BEACON API).

The method 500 can include the client device identifying an indication of an interaction with the content item presented within the content slot of the information resource (BLOCK 525). For example, a click identifier generation module of the asynchronous click transmission script can cause the client device to identify an interaction (e.g., a click, a selection, a touch, a command, etc.) with the content item presented within the content slot of the information resource. In some implementations, once the content item is clicked on, a signal or an event indicating the click can be generated and detected by the application or the asynchronous click transmission script executing on the client device.

The method 500 can include the client device generating a click identifier that uniquely identifies the interaction with the content item (BLOCK 530). For example, the click identifier generation module of the asynchronous click transmission script can cause the client device to generate a click identifier that uniquely identifies the interaction with the content item. In some implementations, the generated click identifier includes the impression identifier transmitted with the content item from the data processing system and a counter. The counter indicates a number of times that the content item is interacted at the client device. For instance, upon identifying an indication of an interaction with the content item presented within the content slot of the information resource, a value of the counter of the click identifier can be adjusted (e.g., incremented or decremented).

The method 500 can include the client device generating a first request comprising a click resource link including the click identifier (BLOCK 535). For example, a first request generation module of the asynchronous click transmission script can cause the client device to generate a first request comprising a click resource link including the click identifier. In some implementations, when the content item is clicked on, a request (e.g., a Hypertext Transfer Protocol (HTTP) request) can be generated, which comprises the click resource link including the click identifier that uniquely identifies the click of the content item.

The method 500 can include the client device transmitting, to a click server, the first request comprising the click resource link including the click identifier (BLOCK 540). For example, the first request generation module of the asynchronous click transmission script can cause the client device to transmit the first request to the click server. In some implementations, the first request can be transmitted to the click server via an asynchronous interface of the application of the client device on which the information resource is presented. For example, the asynchronous interface can be a BEACON application plugin (API).

The method 500 can include the client device generating a resource link (BLOCK 545) that identifies (i) a resource identifier of a landing page corresponding to the content item, and (ii) the click identifier that uniquely identifies the interaction with the content item. For example, a second request generation module of the asynchronous click transmission script can cause the client device to generate the resource link by appending the click identifier to the resource identifier of the landing page. A landing page can be a web page or other document that is displayed to the user when the user clicks on the content item. The resource identifier of a landing page can be a URL or other identifiers of the landing page.

The method 500 can include the client device transmitting the second request comprising the generated resource link (BLOCK 550) to access the landing page of the content item independent of transmitting the first request. For example, the asynchronous click transmission script can cause the client device to transmit the first request and the second request independently of the transmission of each other. In some implementations, the second request can be transmitted without waiting for a response message of the first request is received by the client device. In some implementations, the first request can be transmitted without waiting for a response message of the second request is received by the client device. In some implementations, the first request can be transmitted to the click server at substantially the same time as the second request is transmitted to a landing page provide server. For example, the second request can be transmitted immediately upon the transmission of the first request, or vice versa. For example, the first request and second request can be transmitted in parallel.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 6:
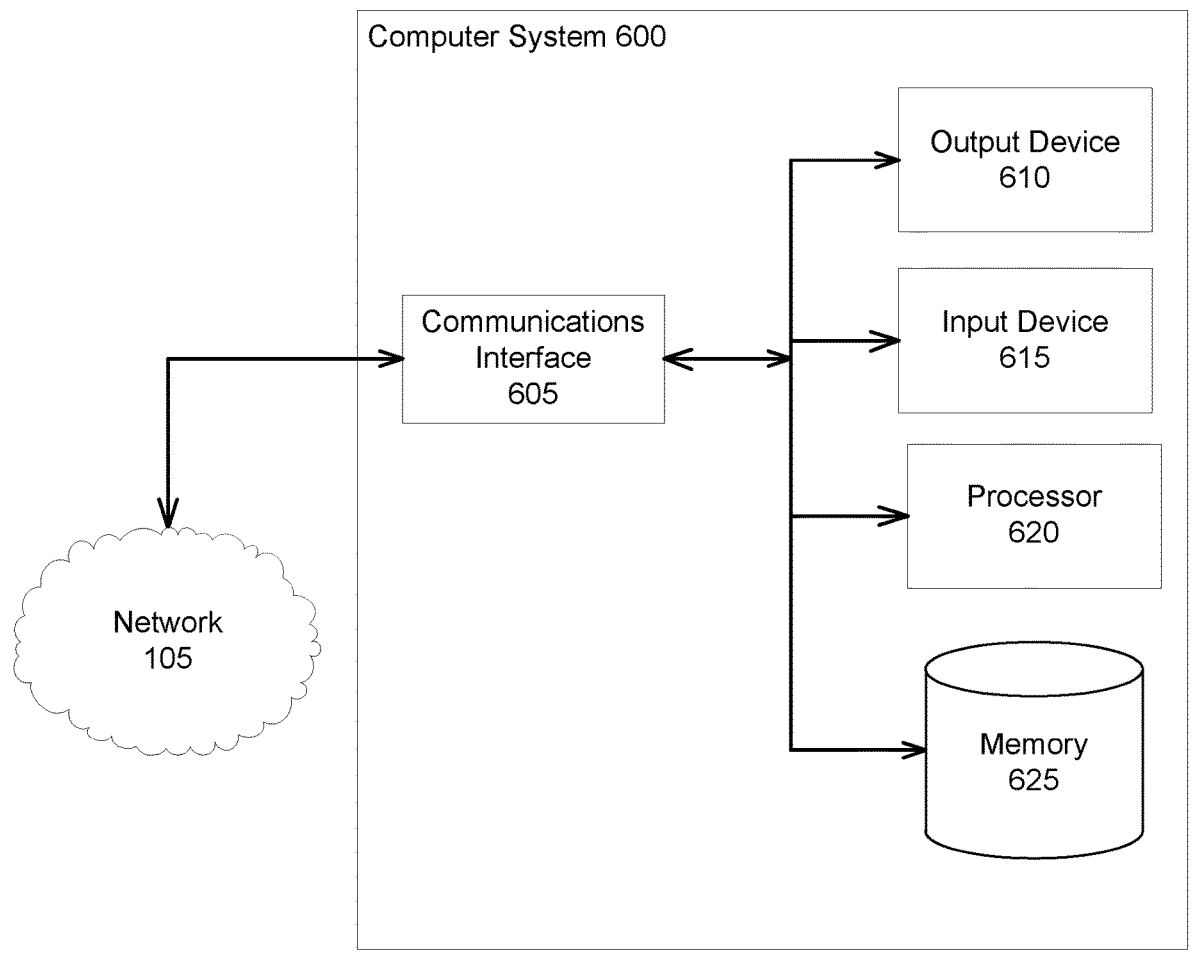
FIG. 6 is a block diagram depicting an illustrative implementation of a general architecture for a computer system that may be employed to implement elements of the systems and methods described and illustrated herein.

FIG. 6 shows the general architecture of an illustrative computer system 600 that may be employed to implement any of the computer systems discussed herein (including the system 110 and its components such as the content request module 130, the content selection module 135, and script provider module 140) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the content request module 130 and the content selection module 135.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present).

Referring again to the system 110 of FIG. 1, the data processing system 110 can include the memory 625 to store information related to the availability of inventory of one or more content units, reservations of one or more content units, among others. The memory 625 can include the database 145. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 110.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A non-transitory computer-readable medium storing computer program instructions, which when executed by one or more processors of a client computing device, cause the client computing device to:
    detect an interaction with a content item presented within a content slot of an information resource presented by the client computing device, the content item received from a data processing system responsive to a request for content sent by the client computing device;
    generate, responsive to detecting the interaction with the content item, a click identifier that uniquely identifies the interaction with the content item;
    generate a resource link that identifies i) a resource identifier of a landing page corresponding to the content item and ii) the click identifier that uniquely identifies the interaction with the content item; and
    transmit a request to access a landing page of the content item comprising the generated resource link.

2. The non-transitory computer-readable medium of claim 1, wherein the computer program instructions when executed by one or more processors cause the client computing device to transmit the click identifier to a click server.

3. The non-transitory computer-readable medium of claim 2, wherein the computer program instructions when executed by one or more processors cause the client computing device to transmit the click identifier to the click server using an asynchronous request or an asynchronous application programming interface (API).

4. The non-transitory computer-readable medium of claim 1, wherein the computer program instructions when executed by one or more processors cause the client computing device to generate the click identifier based on a random universally unique identifier (UUID).

5. The non-transitory computer-readable medium of claim 1, wherein in generating the resource link the computer program instructions when executed by one or more processors cause the client computing device to append the click identifier to the resource identifier of the landing page.

6. The non-transitory computer-readable medium of claim 1, wherein the computer program instructions are part of the information resource.

7. The non-transitory computer-readable medium of claim 1, wherein the computer program instructions further cause the client computing device to:
    receive, from the data processing system, responsive to a content request transmitted to the data processing system, the content item including an asynchronous click transmission script which, when executed by the one or more processors of a client computing device, causes the client device to detect the interaction, generate the click identifier, generate the resource link, and transmit the request.

8. A method of reducing latency in online network traffic, the method comprising:
    providing, by a data processing system to a client computing device via a communications network, computer program instructions for monitoring interactions with content items, the computer program instructions when executed by one or more processors of the client computing device, cause the client computing device to:
    detect an interaction with a content item presented within a content slot of an information resource presented by the client computing device, the content item received from the data processing system responsive to a request for content sent by the client computing device;

generate, responsive to detecting the interaction with the content item, a click identifier that uniquely identifies the interaction with the content item;

generate a resource link that identifies i) a resource identifier of a landing page corresponding to the content item and ii) the click identifier that uniquely identifies the interaction with the content item; and transmit a request to access a landing page of the content item comprising the generated resource link.

9. The method of claim 8, wherein the computer program instructions when executed by one or more processors cause the client computing device to transmit the click identifier to a click server.

10. The method of claim 9, wherein the computer program instructions when executed by one or more processors cause the client computing device to transmit the click identifier to the click server using an asynchronous request or an asynchronous application programming interface (API).

11. The method of claim 8, wherein the computer program instructions when executed by one or more processors cause the client computing device to generate the click identifier based on a random universally unique identifier (UUID).

12. The method of claim 8, wherein in generating the resource link the computer program instructions when executed by one or more processors cause the client computing device to append the click identifier to the resource identifier of the landing page.

13. The method of claim 8, wherein the computer program instructions are part of the information resource.

14. The method of claim 8, wherein the information resource is presented by an application installed on the client computing device, the application including at least one of a browser, a mobile application, a gaming application or a global positioning system (GPS) application.

15. A system for reducing latency in online network traffic, the system comprising:
a memory and a processor configured to provide, to a client computing device via a communications network, computer program instructions for monitoring interactions with content items, the computer program instructions when executed by one or more processors of the client computing device, cause the client computing device to:

detect an interaction with a content item presented within a content slot of an information resource presented by the client computing device, the content item received from a data processing system responsive to a request for content sent by the client computing device;

generate, responsive to detecting the interaction with the content item, a click identifier that uniquely identifies the interaction with the content item;

generate a resource link that identifies i) a resource identifier of a landing page corresponding to the content item and ii) the click identifier that uniquely identifies the interaction with the content item; and transmit a request to access a landing page of the content item comprising the generated resource link.

16. The system of claim 15, wherein the computer program instructions when executed by one or more processors cause the client computing device to transmit the click identifier to a click server.

17. The system of claim 16, wherein the computer program instructions when executed by one or more processors cause the client computing device to transmit the click identifier to the click server using an asynchronous request or an asynchronous application programming interface (API).

18. The system of claim 15, wherein the computer program instructions when executed by one or more processors cause the client computing device to generate the click identifier based on a random universally unique identifier (UUID).

19. The system of claim 15, wherein in generating the resource link the computer program instructions when executed by one or more processors cause the client computing device to append the click identifier to the resource identifier of the landing page.

20. The system of claim 15, wherein the computer program instructions are part of the information resource.

* * * * *